Patented Jan. 22, 1935

1,988,529

UNITED STATES PATENT OFFICE 1,988,529

LOW VISCOSITY VINYL POLYMERS

James H. Werntz, Wilmington, Del., assignor to E. I. du Pont de Nemours & Company, Wilmington, Del., a corporation of Delaware No Drawing. Application March 1, 1930, Serial No. 432,556

37 Claims. (Cl. 260—2)

This invention relates to synthetic resins, and has particular reference to resins prepared by the polymerization of vinyl compounds. More particularly this invention relates to means for controlling the viscosity, maintaining the color, and increasing the yields of these resins.

The preparation of synthetic resins, particularly those of the type derived from the polymerization of vinyl compounds, has been attended in the past with uncertainty. Those batches of polymer which had excellent color and good yield would often have viscosity so high as to make their use in coating compositions difficult. Other batches made under apparently identical conditions would have good viscosity but would be very dark in color and would be produced only in low yields. The polymerization of these resins when carried out by heat at temperatures above 130° C., although accompanied by an advantageous lowering of viscosity, was accompanied by a darkening of the product which rendered it substantially useless. The reason for these variations has previously not been understood, and has resulted in inability to secure a uniform product.

An object of this invention is the determination of factors which have heretofore made impossible the production of vinyl resins of consistently uniform quality. Another object of my invention is the development of a process by which vinyl resins of consistently uniform quality may be obtained. Another object of my invention is to control the color and the viscosity of vinyl resins. Still another object is to polymerize vinyl compounds to resins of satisfactory characteristics at higher temperatures than have previously been practicable. A still further object of my invention is to increase the yields of those resins which are derived from the polymerization of vinyl compounds.

These objects are accomplished, in general, by adjusting the acidity of the polymerizable substance so that during polymerization it will contain an amount of acid which will insure the production of a resin having satisfactory qualities.

I have discovered that the uncertainty inherent in the previous syntheses of resins, particularly of the resins of the vinyl class, was caused mainly by the varying percentages of acid in the raw materials during polymerization. I have discovered that resinous compositions derived from raw materials having relatively high acidity usually had relatively low viscosity, and that those resins having high viscosity were generally derived from polymerizable substances practically free from acid. I also discovered that resins derived from polymerizable substances having a high acidity were of poor color and that resins derived from polymerizable substances having practically no acidity had excellent color. I deduced from this that I could overcome the previous uncertainty in the polymerization of these compounds and produce a composition of uniform color and excellent viscosity by the relatively simple expedient of regulating the acidity of the raw materials. I have, furthermore, discovered that, where the raw materials contain an excess of acid, I can accomplish the control of the excess to perfection by the use of ethylene oxide. I have also discovered that, by correct regulation of the acid content of the raw materials during polymerization, I can increase the yield of polymer. Furthermore, I have discovered that the polymerization of acid or non-acid vinyl compounds can be successfully carried out with the production of satisfactory resins at temperatures as high as 150° C. provided a sufficient amount of anti-acid, such as ethylene oxide, is present to react with the excess of acid resulting from the acid already present in the raw materials and that which is generated by the high temperature of polymerization. The ability to polymerize at a higher temperature, which the practice of my invention secures, causes a reduction in viscosity more than sufficient to overcome the increase in viscosity which the use of ethylene oxide itself causes.

Acids, I have discovered, are to a certain extent anti-catalysts for polymerization. By that I mean that, while the use of an acid lowers the viscosity of the resulting product, it also lowers the yield. Thus, a sample of vinyl chloride which upon polymerization gave a 50% yield of resin which was a gel in 40% concentration, upon the regulation of the acid in the raw materials, hydrochloric acid being used, to form between 1% and 2% of the vinyl chloride, polymerized to a black resin with a viscosity of less than one poise at 40% concentration. The yield, however, dropped to 25%. The addition of enough ethylene oxide to the raw materials to neutralize all but enough acid to form about one-half of one percent of the polymerizable substance, upon polymerization gave a resin of excellent color and a yield between 55% and 60%, which is, it will be observed, an improvement over the best yields obtainable without the practice of my invention.

The control of excess acid has been attempted by a large number of agents, including mild inorganic bases, alkali carbonates such as sodium carbonate, tertiary butyl alcohol, pyridine, dioxan, amines including triethanol amine and diphenylamine, and lead alkyls such as triethyl lead chloride and lead tetraethyl. Of these, all were used with greater or less success, but pyridine and lead tetraethyl yielded the best results. All of these compounds, however, were inferior to ethylene oxide. The homologues and derivatives of ethylene oxide, such as styrene oxide, may be used with some success in place of ethylene oxide, but ethylene oxide is preferred.

In the practice of my invention it is advisable to regulate the acidity of the raw materials before polymerization, so that there will be enough acid present during polymerization to insure the product the physical and chemical characteristics which will render it most useful. If the acid to be used or which the polymerizable substance contains is hydrochloric acid there should be an acid content of between 0% and 1% of the weight of the polymerizable substance. It is to be understood that variations in the acidity necessary to give the best results will be caused by the particular raw materials used. It is also true that different percentages of acidity are required with different acids, the figure of between 0% and 1% being the percentage which best serves the purpose when the acid present is hydrochloric acid. For other acids an amount should be used which is equivalent in effect to this amount of hydrochloric acid.

In the practice of my invention excellent results are obtained by determining the acidity of the raw materials and adding sufficient acid thereto to bring the acidity of the polymerizable substance up to the ideal, or, if there be too much acid present, in adding ethylene oxide sufficient to react with the undesired excess of acid. When polymerization is carried out at temperatures above 130° C. it is usually unnecessary to add acid and is usually advisable to add ethylene oxide because a certain amount of acid appears to be generated by the decomposition, or reaction, of the ingredients. In cases where one quantity of vinyl derivative has a low acid content and another quantity has a high acid content, satisfactory results can be obtained by mixing them in proportions such that the mixture obtained will have a satisfactory acid percentage. Also, the use of a small excess of ethylene oxide where the acid in the sample is hydrochloric acid (Example IV) produces a resin having good color but somewhat higher viscosity than when an excess of acid is present. The fact that the viscosity is not too high is doubtless due, in part at least, to the presence of the reaction product of ethylene oxide and hydrochloric acid.

Control of the viscosity by the regulation of the acid content is not limited to the use of the specific acids named in the examples hereafter given, but can be attained with greater or less success by the use of practically any acid. It is obvious, however, that the suitability of the different acids will vary.

The resins which can be prepared by the practice of my invention include not only the polymer of a single compound, such as vinyl chloride, but the polymer of mixed compositions, such as vinyl chloride-vinyl acetate, and the resins formed by the polymerization of polymerizable compositions in the presence of other materials.

Polymerization may be carried out in this invention either by the batch method such as is customary in the art, or by a continuous flow process.

In the examples which will be found below, it is to be observed that vinyl chloride, vinyl benzene (styrene), and vinyl chloride-vinyl acetate are mentioned as the raw materials whose polymerization results in the formation of resins, but these examples are given for purposes of illustration only and are not to be deemed in any sense limitative. The invention is applicable to all resins of this class and particularly to the other resins prepared from vinyl derivatives.

*Example I*

A mixture of 1500 g. of vinyl chloride containing 2.7% acid as impurity, 1000 g. toluene, and 45 g. benzoyl peroxide was passed through a lead-lined tube three feet in length and having a volume of 500 cc., heated to 120–125° C., at a rate of 300 cc. per hour under a pressure of 500 lbs. per sq. in. This yielded 1465 g. of solution having a solids content of 27.8% which indicated a yield of 27.2%. The color of the resin was black and the viscosity was less than 0.5 poise in 40% concentration at 20° C.

A mixture of the same materials in the same proportions as above but with the addition of 22.5 g. of ethylene oxide added for the purpose of reacting with excess acid was subjected to the identical process of polymerization and gave a 43.5% yield of colorless resin having a viscosity of less than 0.5 poise in 40% concentration at 20° C.

*Example II*

A solution containing 1500 g. vinyl chloride substantially acid free, 1000 g. toluene, 60 g. benzoyl peroxide, and 30 g. ethylene oxide, which indicates 58.0% vinyl chloride, 38.5% toluene, 2.3% benzoyl peroxide, and 1.2% ethylene oxide, was passed through a three-foot, lead-lined tube at 463 cc. capacity at 150° C. at a rate of 300 cc. per hour under a pressure of 500 lbs. per sq. in. The solution obtained in this way was light colored, contained 1959 g., of which 47.5% was polymer (indicating a yield of 61.4%), and had a viscosity of 1.3 poises at 20° C. which is relatively low for a solution of this concentration.

*Example III*

A mixture containing 1980 g. vinyl chloride, 1620 g. vinyl acetate, 2400 g. toluene, 108 g. benzoyl peroxide, and 24 g. ethylene oxide was passed through an eight-foot, porcelain-lined tube of 800 cc. capacity at a rate of 1000 cc. per hour under a pressure of 500 lbs. per sq. in. at a temperature of 105°–110° C. The solution obtained in this manner weighed 5400 g., was light in color, contained 43.0% solids (a yield of 64.6%), and had a viscosity of 0.5 poise at 25° C. The product was compatible with pyroxylin. This mixture of materials on polymerization yielded a resin solution of satisfactory viscosity without the use of acid. The ethylene oxide was introduced to insure a light colored product.

*Example IV*

A mixture containing 1500 parts vinyl chloride, 1000 parts toluene, 45 parts benzoyl peroxide, 7.5 parts hydrogen chloride, and 22 parts ethylene oxide was passed through the continuous flow apparatus of Example II at a temperature of 120°–125° C. The product weighed 2118 g., was white in color, contained 48.6% solids, and had a viscosity of 1.4 poises at 20° C.

*Example V*

A mixture of 2400 g. vinyl chloride, 1600 g. toluene, 48 g. benzoyl peroxide, and 12 g. hydrogen chloride was passed through an eight-foot, enamel-lined tube of 800 cc. capacity at a rate of one liter per hour under a pressure of 500 pounds per sq. in. and at a temperature of 105°–110° C. The solution obtained in this manner weighed 2885 g. and contained 22% of polymerized vinyl chloride which indicates a yield of 26.79%. A 42% solution of this product had a viscosity of 1.2 poises at 25° C., whereas a solution of polymer prepared from the same sample of vinyl chloride but in the absence of hydrogen chloride, was a gel at this concentration.

*Example VI*

A solution containing 1500 g. vinyl chloride, 1000 g. toluene, 60 g. benzoyl peroxide, and 37.5 g. formic acid was passed through a four-foot, lead-lined tube of about 500 cc. capacity at a rate of 300 cc. per hour under a pressure of 500 pounds per sq. in. and a temperature of 110°–115° C. The solution obtained in this way contained 40% solids, and had a viscosity less than 0.5 poise at 25° C.

*Example VII*

A mixture of 1500 g. vinyl chloride, 1000 g. toluene, 45 g. benzoyl peroxide, and 10 g. benzoic acid was passed through a three-foot, lead-lined reaction tube at 463 cc. capacity at a rate of 300 cc. per hour under a pressure of 500 pounds per sq. in. and at a temperature of 110°–115° C. The solution obtained in this manner had a solids content of 35.8%, and a viscosity less than 0.5 poise at 25° C. The solution obtained in this experiment was light colored.

*Example VIII*

A mixture of 1240 g. vinyl chloride, 260 g. vinyl acetate, 1000 g. toluene, 45 g. benzoyl peroxide, 7.5 g. hydrogen chloride, and 11 g. ethylene oxide was passed through a lead-lined reaction tube of 230 cc. capacity at a rate of 300 cc. per hour at a temperature of 115°–120° C. and under a pressure of 500 pounds per sq. in. The solution obtained in this way weighed 1968 g., was white in color, contained 40.1% solids (indicating a yield of 45.3%), and had a viscosity less than 0.5 poise at 20° C. The polymer contained 45.4% chlorine indicating that it contained 79.7% polyvinyl chloride.

*Example IX*

A solution containing 207 g. styrene, 10 g. acetic acid and 343 g. ethyl benzene was heated at 110°–120° C. for 72 hours. The ethyl benzene and unpolymerized styrene were removed by steam distillation, leaving 165 g. of meta styrene (polymerized styrene) which indicates a yield of about 80%. Solutions of this product were light colored and had lower viscosity characteristics than those of meta styrene prepared under the same conditions but in the absence of acetic acid.

*Example X*

A mixture of 1200 g. acid-free vinyl chloride, 1200 g. vinyl chloride containing acid equivalent in effect to 1% hydrochloric acid, 1600 g. toluene, and 48 g. benzoyl peroxide was passed through a ten-foot, enamel-lined tube having a capacity of 800 cc. at a rate of 800 cc. per hour at a temperature of 105°–110° C. and under a pressure of 550 pounds per sq. in. The solution of polymer obtained in this manner was light colored and had a viscosity less than 0.5 poise at 25° C. in a 35% solution in toluene. The resin obtained by polymerizing the acid-free vinyl chloride under these conditions was a gel at 35% concentration in toluene solution whereas a resin obtained by polymerizing vinyl chloride containing acid equivalent in effect to 1% hydrochloric acid under the same conditions was dark colored.

It will be observed in the above examples that certain losses occurred and it is pointed out that these losses were mainly occasioned by the escape of vinyl chloride gas, which in commercial practice would be recovered and the loss reduced to a minimum.

The product produced by my invention can be used with great facility in coating compositions, in the plastic arts, and for such other purposes as resins are used. When ethylene oxide is used in coating compositions containing resins of the type disclosed in this application, that is to say, of vinyl resins, an improvement in the color stability and the durability of the coating composition is observed.

The advantages of my invention are, in part, the production of resins from vinyl derivatives by a method which yields certain and consistent results, the preparation of vinyl polymers having both good color and excellent viscosity characteristics, the increasing of the yields of the product, and the polymerization of vinyl derivatives at higher temperatures than had previously been used. Other advantages will be apparent from the reading of the specification and claims.

As many apparently widely different embodiments of this invention may be made without departing from the spirit and scope thereof, it is to be understood that I do not limit myself to the specific embodiments thereof except as defined in the appended claims.

I claim:

1. The process of preparing a synthetic resin consisting in polymerizing styrene in the presence of an amount of an acid equivalent in effect to approximately one-half of one percent of hydrochloric acid.

2. The method of preparing a synthetic resin of the vinyl type having satisfactory color consisting in polymerizing a polymerizable vinyl compound of the class consisting of vinyl esters and styrene in the presence of ethylene oxide in quantities sufficient to utilize all but a small quantity of free acid in the mixture.

3. The method of preparing a synthetic resin of the vinyl type consisting in polymerizing a polymerizable vinyl compound of the class consisting of vinyl esters and styrene in the presence of ethylene oxide in quantities sufficient to utilize all but a small quantity of free acid at temperatures between 130° C.–150° C.

4. The method of preparing a synthetic resin of the vinyl type consisting in polymerizing a polymerizable vinyl compound of the class consisting of vinyl esters and styrene containing an excess of an acid in the presence of sufficient ethylene oxide to counteract the effect of the excess but insufficient to nullify the effect of such an amount of acid as is desirable to insure a product having satisfactory color and viscosity characteristics.

5. The method of preparing a synthetic resin of the vinyl type consisting in polymerizing a polymerizable vinyl compound of the class consisting of vinyl esters and styrene containing an excess of an acid, by heat, in the presence of sufficient ethylene oxide to counteract the effect of the excess but insufficient to nullify an amount of acid equivalent in effect to between 0% and 1% by weight based on the polymerizable material hydrochloric acid.

6. The method of preparing a synthetic resin of the vinyl type consisting in polymerizing a polymerizable vinyl compound of the class consisting of vinyl esters and styrene containing an excess of hydrochloric acid, by heat, in the presence of sufficient ethylene oxide to counteract the effect of the excess but insufficient to nullify an amount of the acid sufficient to form approximately one-half of one percent of the weight of the polymerizable substance.

7. The method of preparing a synthetic resin consisting in polymerizing vinyl chloride containing an excess of an acid by heating in the presence of sufficient ethylene oxide to counteract the effect of the excess but insufficient to nullify an amount of the acid equivalent in effect to about one-half of one percent of hydrochloric acid based on the weight of the polymerizable material.

8. The process of preparing a resin consisting in passing a mixture containing 1980 parts by weight of vinyl chloride, 1620 parts by weight vinyl acetate, 2400 parts by weight toluene, 180 parts by weight benzoyl peroxide and 24 parts by weight ethylene oxide through an eight-foot porcelain-lined reaction tube of 800 cc. capacity at a rate of about 1000 cc. per hour under a pressure of about 500 lbs. per sq. in. at a temperature of about 110° C.

9. The process of preparing a resin consisting in passing a mixture comprising vinyl chloride, toluene, benzoyl peroxide and sufficient ethylene oxide to react with all but enough acid to insure a product having satisfactory color and viscosity characteristics, through a heated porcelain-lined reaction tube under pressure.

10. The process of preparing a resin consisting in passing a mixture containing a vinyl compound of the class consisting of vinyl esters and styrene containing acid, a solvent, a polymerization catalyst, and ethylene oxide in sufficient quantity to react with all but enough acid to insure a product of comparatively light color and low viscosity through a heated reaction tube.

11. The method of preparing a composition of matter which consists in polymerizing a vinyl compound of the class consisting of vinyl esters and styrene, containing acid in an amount sufficient to deleteriously affect the quality of the resulting compound in the presence of sufficient ethylene oxide to counteract the effect of the excess acid but insufficient to counteract the effect of such an amount of acid as is desirable to insure a product having satisfactory color and viscosity characteristics.

12. The method of preparing a composition of matter which consists in polymerizing a vinyl compound of the class consisting of vinyl esters and styrene, containing acid in an amount sufficient to deleteriously affect the quality of the resulting compound in the presence of sufficient anti-acid to counteract the effect of the excess acid but insufficient to counteract the effect of such an amount of acid as is desirable to insure a product having satisfactory color and viscosity characteristics.

13. The method of making a composition of matter from a member selected from the class consisting of vinyl esters and styrene which comprises determining the acidity of the polymerization mixture, adding acid or anti-acid thereto until it contains a small amount of acid, and polymerizing.

14. The method of making a composition of matter from a member selected from the class consisting of vinyl esters and styrene which comprises determining the acidity of the polymerization mixture, adding acid or anti-acid thereto until it contains an amount of an acid equivalent in effect to about one-half of one per cent by weight hydrochloric acid (based on the polymerizable material), and polymerizing.

15. The method of making a composition of matter from a member selected from the class consisting of vinyl esters and styrene which comprises determining the acidity of the polymerization mixture, adding acid or anti-acid thereto until it contains an amount of an acid equivalent in effect to about one per cent by weight hydrochloric acid (based on the polymerizable material), and polymerizing.

16. The method of making a composition of matter from a member selected from the class consisting of vinyl esters and styrene which comprises determining the acidity of the polymerization mixture, adding acid or anti-acid thereto until it contains an amount of an acid equivalent in effect to less than about one per cent by weight hydrochloric acid (based on the polymerizable material), and polymerizing.

17. The process described in claim 12 in which the vinyl compound is styrene.

18. The process described in claim 12 in which the vinyl compound is a vinyl ester.

19. The process described in claim 12 in which the vinyl compound is the vinyl ester of an organic acid.

20. The process described in claim 12 in which the vinyl compound is vinyl acetate.

21. The method of preparing a composition of matter which consists in polymerizing a vinyl compound of the class consisting of vinyl esters and styrene containing acid in an amount sufficient to deleteriously affect the quality of the resulting compound in the presence of sufficient anti-acid to counteract the effect of all excess acid except an amount equal in effect to about ½ of 1% hydrochloric acid, whereby to produce a product having satisfactory color and viscosity characteristics.

22. The process described in claim 21 in which the vinyl compound is styrene.

23. The process described in claim 21 in which the vinyl compound is a vinyl ester.

24. The process described in claim 21 in which the vinyl compound is the vinyl ester of an organic acid.

25. The process described in claim 21 in which the vinyl compound is vinyl acetate.

26. The method of preparing a composition of matter which consists in polymerizing a vinyl compound of the class consisting of vinyl esters and styrene containing insufficient acid to insure the production of a polymer of low viscosity, which comprises adding acid to the polymerization mixture in a quantity sufficient to insure the production of a polymer of relatively low viscosity but insufficient to deleteriously affect the color of the polymerized product.

27. The process described in claim 26 in which the vinyl compound is styrene.

28. The process described in claim 26 in which the vinyl compound is a vinyl ester.

29. The process described in claim 26 in which the vinyl compound is the vinyl ester of an organic acid.

30. The process described in claim 26 in which the vinyl compound is vinyl acetate.

31. The method of preparing a composition of matter which consists in polymerizing a vinyl compound of the class consisting of vinyl esters and styrene containing insufficient acid to insure the production of a polymer of low viscosity characteristic, which comprises adding acid to the polymerization mixture in a quantity sufficient to insure the presence during polymerization of an amount of an acid equivalent in effect to about ½ of 1% hydrochloric acid whereby to produce a product of light color and relatively low viscosity.

32. The process described in claim 31 in which the vinyl compound is styrene.

33. The process described in claim 31 in which the vinyl compound is a vinyl ester.

34. The process described in claim 31 in which the vinyl compound is the vinyl ester of an organic acid.

35. The process described in claim 31 in which the vinyl compound is vinyl acetate.

36. The product of the process described in claim 12.

37. The product of the process described in claim 21.

JAMES H. WERNTZ.